(12) United States Patent
Oh et al.

(10) Patent No.: US 9,397,367 B2
(45) Date of Patent: Jul. 19, 2016

(54) NON-AQUEOUS ELECTROLYTE AND LITHIUM SECONDARY BATTERY COMPRISING THE SAME

(71) Applicant: LG Chem, Ltd., Seoul (KR)

(72) Inventors: Jeong Woo Oh, Daejeon (KR); Kyoung Ho Ahn, Daejeon (KR); Min Jung Kim, Daejeon (KR); Yi Jin Jung, Daejeon (KR); Doo Kyung Yang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/767,033

(22) PCT Filed: May 8, 2015

(86) PCT No.: PCT/KR2015/004613
§ 371 (c)(1),
(2) Date: Aug. 11, 2015

(87) PCT Pub. No.: WO2015/190705
PCT Pub. Date: Dec. 17, 2015

(65) Prior Publication Data
US 2016/0172707 A1 Jun. 16, 2016

(30) Foreign Application Priority Data
Jun. 13, 2014 (KR) ........................ 10-2014-0071891

(51) Int. Cl.
| | |
|---|---|
| *H01M 10/0567* | (2010.01) |
| *H01M 10/0569* | (2010.01) |
| *H01M 10/0568* | (2010.01) |
| *H01M 4/587* | (2010.01) |
| *H01M 4/38* | (2006.01) |
| *H01M 4/485* | (2010.01) |
| *H01M 4/525* | (2010.01) |
| *H01M 4/505* | (2010.01) |
| *H01M 4/58* | (2010.01) |
| *H01M 2/16* | (2006.01) |
| *H01M 10/0525* | (2010.01) |

(52) U.S. Cl.
CPC ........ *H01M 10/0567* (2013.01); *H01M 2/1653* (2013.01); *H01M 2/1686* (2013.01); *H01M 4/38* (2013.01); *H01M 4/386* (2013.01); *H01M 4/387* (2013.01); *H01M 4/485* (2013.01); *H01M 4/505* (2013.01); *H01M 4/525* (2013.01); *H01M 4/587* (2013.01); *H01M 4/5825* (2013.01); *H01M 10/0525* (2013.01); *H01M 10/0568* (2013.01); *H01M 10/0569* (2013.01); *H01M 2220/20* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 2004/0009393 A1 | 1/2004 | Kim et al. | |
| 2004/0013944 A1* | 1/2004 | Lee ........................ | H01M 6/168 429/317 |
| 2005/0277027 A1 | 12/2005 | Kim et al. | |
| 2013/0034759 A1* | 2/2013 | Funada ............. | H01M 10/0525 429/90 |
| 2013/0113635 A1 | 5/2013 | Whitlow et al. | |

FOREIGN PATENT DOCUMENTS

| | | |
|---|---|---|
| JP | 2009224258 A | 10/2009 |
| KR | 20040006429 A | 1/2004 |
| KR | 20040099606 A | 12/2004 |
| KR | 20050113990 A | 12/2005 |

OTHER PUBLICATIONS

International Search Report and Written Opinion for Application No. PCT/KR2015/004613 dated Jul. 16, 2015.

\* cited by examiner

*Primary Examiner* — Carlos Barcena
*Assistant Examiner* — Wojciech Haske
(74) *Attorney, Agent, or Firm* — Lerner, David, Littenberg, Krumholz & Mentlik, LLP

(57) ABSTRACT

Provided are a non-aqueous electrolyte, which includes an organic solvent, a lithium salt, and a phosphorus compound including an acryloyloxy group, and a lithium secondary battery including the non-aqueous electrolyte. Since the non-aqueous electrolyte includes the phosphorus compound to form a stable solid electrolyte interface (SEI) on an electrode during charge and discharge of the battery, initial capacity and power characteristics at room temperature and low temperature as well as lifetime characteristics of the battery may be improved.

22 Claims, 3 Drawing Sheets

NON-AQUEOUS ELECTROLYTE AND LITHIUM SECONDARY BATTERY COMPRISING THE SAME

CROSS-REFERENCE TO RELATED APPLICATION

This application is a national phase entry under 35 U.S.C. §371 of International Application No. PCT/KR2015/004613, filed May 8, 2015, which claims priority to Korean Patent Application No. 10-2014-0071891, filed Jun. 13, 2014, the disclosures of which are incorporated herein by reference.

TECHNICAL FIELD

The present invention relates to a non-aqueous electrolyte and a lithium secondary battery comprising the same.

BACKGROUND ART

Recently, interests in energy storage technologies have been increasingly grown. While the application of the energy storage technologies is expanded to mobile phones, camcorders, notebook PCs, and even to electric vehicles, efforts for research and development of electrochemical devices have been materialized.

The development of rechargeable secondary batteries among these electrochemical devices has become the center of attention. Recently, in the development of the secondary batteries, research into the development of the design of novel electrode and battery has been conducted in order to improve capacity density and specific energy.

Among the currently used secondary batteries, lithium secondary batteries, developed in the early 1990's, are spotlighted because the lithium secondary batteries may have higher operating voltage and significantly higher energy density than conventional batteries, such as Ni-MH batteries, Ni—Cd batteries, and $H_2SO_4$—Pb batteries, using aqueous electrolytes. However, the lithium secondary batteries may have limitations in that fire and explosion may occur due to the use of organic electrolytes and the manufacture thereof may be difficult. Accordingly, lithium-ion polymer batteries for improving the limitations of the lithium secondary batteries have been developed. However, the capacities thereof may be relatively lower than those of the lithium secondary batteries.

During initial charge of a lithium secondary battery, lithium ions generated from a positive electrode active material, such as a lithium metal oxide, move to a negative electrode active material, such as graphite, to be intercalated into the negative electrode active material. In this case, since the lithium ions are highly reactive, the lithium ions react with an electrolyte and carbon constituting the negative electrode active material on a surface of the negative electrode active material to form compounds such as $Li_2CO_3$, $Li_2O$, or LiOH. These compounds form a kind of stable film (solid electrolyte interface, SEI) on the surface of the negative electrode active material. The film formed on the surface of the negative electrode active material may only pass the lithium ions by acting as an ion tunnel and may prevent the destruction of the structure of a negative electrode caused by the intercalation of organic solvent molecules having a high molecular weight, which move with the lithium ions in the electrolyte, into the negative electrode active material. Also, since the film may prevent the contact between the negative electrode active material and the electrolyte, the decomposition of the electrolyte may not occur and the amount of the lithium ions in the electrolyte may be reversibly maintained. Thus, stable charge and discharge may be maintained.

However, with respect to the lithium secondary battery, since the carbon material may be desorbed from an electron transfer pathway due to the changes in lattice parameter of carbon and the generation of gas caused by the decomposition of the solvent as the charge and discharge proceed, the capacity thereof may be reduced. Thus, in order to address these limitations, there is a continuous need to develop a method of improving initial capacity and power of the battery.

DISCLOSURE OF THE INVENTION

Technical Problem

The present invention provides a non-aqueous electrolyte which may improve initial capacity and power characteristics as well as lifetime characteristics of a battery by forming a stable film on an electrode.

The present invention also provides a lithium secondary battery, a battery module, and a battery pack, which comprise the non-aqueous electrolyte.

Technical Solution

According to an aspect of the present invention, there is provided a non-aqueous electrolyte comprising: an organic solvent; a lithium salt; and a phosphorus compound of Formula 1,

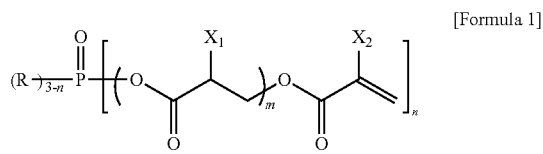

[Formula 1]

wherein, in Formula 1, $X_1$ and $X_2$ are each independently a hydrogen atom or an alkyl group having 1 to 4 carbon atoms, R is selected from the group consisting of an alkyl group having 1 to 20 carbon atoms, a cycloalkyl group having 3 to 20 carbon atoms, a hydroxyl group, and an alkoxy group having 1 to 20 carbon atoms, m is an integer of 0 to 29, and n is an integer of 1 or 2.

Advantageous Effects

Since a non-aqueous electrolyte according to an embodiment of the present invention comprises a phosphorous compound including an acryloyloxy group as an electrolyte additive, a stable film may be formed on an electrode during charge and discharge when used in a battery. As a result, initial capacity and power characteristics at room temperature and low temperature as well as lifetime characteristics of the battery may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
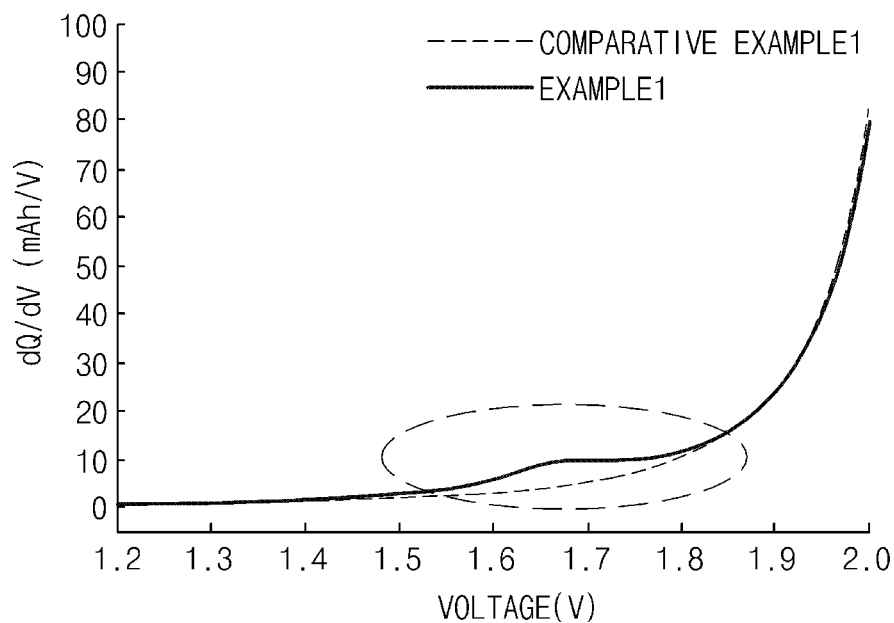
FIG. 1 is a graph illustrating capacitance versus voltage ratios (dQ/dV) of batteries prepared in Example 1 and Comparative Example 1.

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

According to an embodiment of the present invention, provided is a non-aqueous electrolyte comprising an organic solvent, a lithium salt, and a phosphorus compound of the following Formula 1.

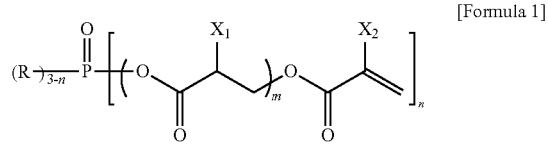

[Formula 1]

In Formula 1, $X_1$ and $X_2$ are each independently a hydrogen atom or an alkyl group having 1 to 4 carbon atoms. In this case, the alkyl group may be specifically a linear or branched alkyl group having 1 to 4 carbon atoms such as a methyl group, an ethyl group, a propyl group, an isopropyl group, an n-butyl group, or a t-butyl group. Specifically, X may be a hydrogen atom or a methyl group.

Also, in Formula 1, R may be one selected from the group consisting of an alkyl group having 1 to 20 carbon atoms, a cycloalkyl group having 3 to 20 carbon atoms, a hydroxyl group (—OH), and an alkoxy group having 1 to 20 carbon atoms. In this case, the alkyl group may be specifically a linear or branched alkyl group having 1 to 20 carbon atoms, such as a methyl group, an ethyl group, a propyl group, an isopropyl group, an n-butyl group, a t-butyl group, a hexyl group, a heptyl group, an octyl group, or a decyl group, the cycloalkyl group may be specifically a cyclopropyl group, a cyclobutyl group, a cyclopentyl group, a cyclohexyl group, an adamantly group, or a norbornyl group, and the alkoxy group may be specifically a methoxy group, an ethoxy group, a propoxy group, a butoxy group, or a t-butoxy group. Specifically, R may be a linear or branched alkyl group or hydroxyl group having 1 to 6 carbon atoms or a hydroxyl group, and, more specifically, may be a hydroxyl group.

Also, in Formula 1, m is an integer of 0 to 29, particularly, an integer of 0 to 3, and more particularly, an integer of 0 or 1.

Furthermore, in Formula 1, n is an integer of 1 or 2.

Specifically, the phosphorus compound of Formula 1 may be a compound, in which $X_1$ and $X_2$ in Formula 1 are each independently a hydrogen atom or a linear or branched alkyl group having 1 to 4 carbon atoms, and R is a linear or branched alkyl group having 1 to 6 carbon atoms or a hydroxyl group. Specifically, the phosphorus compound of Formula 1 may be a compound, in which $X_1$ and $X_2$ are each independently a hydrogen atom or a linear or branched alkyl group having 1 to 4 carbon atoms, R is a hydroxyl group, m is an integer of 0 or 1, and n is an integer of 1 or 2.

Also, the phosphorus compound of Formula 1, Specifically, may be a compound of the following Formula 1a or 1b;

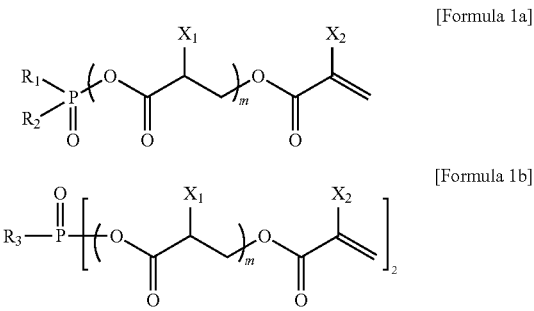

[Formula 1a]

[Formula 1b]

In Formulae 1a and 1b, $X_1$, $X_2$, and m are the same as defined above, $R_1$ and $R_2$ are each independently an alkyl group having 1 to 20 carbon atoms or a cycloalkyl group having 3 to 20 carbon atoms, specifically, a linear or branched alkyl group having 1 to 6 carbon atoms, and $R_3$ is a hydroxyl group (—OH) or an alkoxy group having 1 to 20 carbon atoms, specifically, a hydroxyl group. In this case, the alkyl group, the cycloalkyl group, and the alkoxy group are the same as defined above.

More specifically, the phosphorus compound of Formula 1 may be one selected from the group consisting of compounds of the following Formulae 2a to 2f.

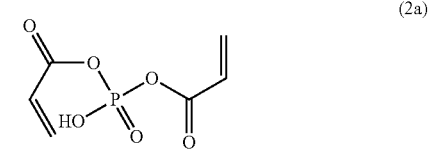

(2a)

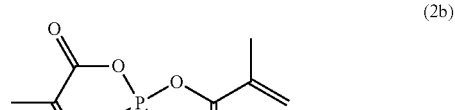

(2b)

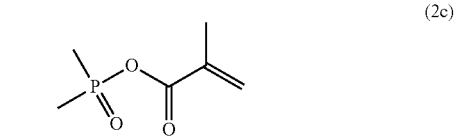

(2c)

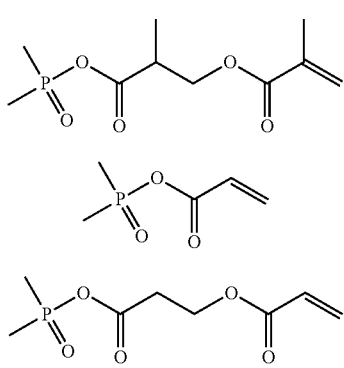

The phosphorus compound of Formula 1 may improve lifetime characteristics as well as initial capacity and power characteristics at room temperature (23±5° C.) and low temperature (−10° C.±5° C.), particularly, at low temperature, by forming a stable solid electrolyte interface (SEI; passive film) on an electrode during charge and discharge of a battery. Also, with respect to a lithium titanium oxide-based negative electrode active material in a lithium secondary battery, a reductive decomposition reaction of an additive may be difficult to occur due to high potential and resistance of the SEI may be high due to catalytic properties of lithium titanium oxide even if the SEI is formed. In contrast, in a case in which the phosphorus compound of Formula 1 is used as an electrolyte additive, since a P=O group included in the phosphorus compound stabilizes the catalytic properties of the lithium titanium oxide and an acryloyloxy group increases the reduction reaction, the resistance of the SEI may be reduced. As a result, the performance and lifetime characteristics of the battery may be further improved.

The above-described phosphorus compound of Formula 1 may be prepared according to a typical method and used, or a commercially available product may be used.

Also, the phosphorus compound of Formula 1 may be comprised in an amount of 0.05 wt % to 5.0 wt % based on a total weight of the non-aqueous electrolyte. In a case in which the amount of the phosphorus compound of Formula 1 is less than 0.05 wt %, a stable film may be difficult to be formed on the electrode and, accordingly, the effect due to the formation of the film may not be sufficient. In a case in which the amount of the phosphorus compound of Formula 1 is greater than 5.0 wt %, since the formed thin film may act as a resistance, there is a risk of reducing the initial capacity and power of the battery.

The non-aqueous electrolyte according to the embodiment of the present invention may comprise an organic solvent and a lithium salt with the phosphorus compound of Formula 1.

Any organic solvent may be used as the organic solvent without particular limitation as long as it may function as a medium through which ions involved in an electrochemical reaction of the battery may move. Specifically, the organic solvent may comprise a carbonate-based solvent, an ester-based solvent, an ether-based solvent, a ketone-based solvent, or an aromatic hydrocarbon-based solvent, and any one thereof or a mixture of two or more thereof may be used.

The carbonate-based organic solvent may specifically comprise cyclic carbonate, linear carbonate, or a mixture thereof. Specific examples of the cyclic carbonate may be ethylene carbonate, propylene carbonate, 1,2-butylene carbonate, 2,3-butylene carbonate, 1,2-pentylene carbonate, 2,3-pentylene carbonate, vinylene carbonate, vinyl ethylene carbonate, or a halide thereof. Also, specific examples of the halide may be fluoroethylene carbonate and the like, but the present invention is not limited thereto. Specific examples of the linear carbonate may be dimethyl carbonate, diethyl carbonate, dipropyl carbonate, ethylmethyl carbonate, methylpropyl carbonate, and ethylpropyl carbonate, but the present invention is not limited thereto.

Furthermore, the ester-based organic solvent may specifically comprise methyl acetate, ethyl acetate, methyl propionate, ethyl propionate, propyl propionate, methyl butyrate, ethyl butyrate, dimethyl sulfoxide, acetonitrile, dimethoxy ethane, diethoxy ethane, sulfolane, γ-butyrolactone, propylene sulfide, or tetrahydrofuran, and any one thereof or a mixture of two or more thereof may be used. Among these materials, the ester-based organic solvent may be a linear ester compound, such as methyl acetate, ethyl acetate, methyl propionate, ethyl propionate, propyl propionate, methyl butyrate, and ethyl butyrate, in consideration of a significant effect of improving low-temperature performance.

Also, the ether-based solvent may be specifically dibutyl ether or tetrahydrofuran, the ketone-based solvent may be specifically cyclohexanone, and the aromatic hydrocarbon-based solvent may be specifically benzene or fluorobenzene.

Since cyclic carbonate-based solvents, such as ethylene carbonate and propylene carbonate, among the above organic solvents are highly viscous organic solvents and have high dielectric constants, the cyclic carbonate-based solvents may well dissociate the lithium salt in the electrolyte. Also, an electrolyte having higher electrical conductivity may be prepared when the above cyclic carbonate-based solvent is used by mixing with the ester-based solvent. Accordingly, the organic solvent may comprise a mixture of the above-described cyclic carbonate and ester-based solvent, and may specifically comprise a mixture in which the above-described ester-based solvent is mixed at a higher concentration than the cyclic carbonate. Specifically, the organic solvent may comprise a mixture, in which the cyclic carbonate-based solvent and the ester-based solvent are mixed in a volume ratio of 5:5 to 2:8. When the phosphorus compound of Formula 1 is used with the cyclic carbonate and the ester-based solvent that are mixed in the above volume ratio, a further improved effect of reducing internal resistance and improving battery characteristics may be obtained.

Also, as the lithium salt in the non-aqueous electrolyte, any lithium salt may be used without particular limitation as long as it is a compound typically used in a lithium secondary battery and capable of providing lithium ions. Specifically, the lithium salt may comprise any one selected from the group consisting of lithium chloride (Lin), lithium bromide (LiBr), lithium iodine (LiI), lithium perchlorate (LiClO$_4$), lithium tetrafluoroborate (LiBF$_4$), lithium hexafluorophosphate (LiPF$_6$), lithium hexafluoroarsenate (LiAsF$_6$), lithium hexafluoroantimonate (LiSbF$_6$), lithium tetrachloroaluminate (LiAlCl$_4$), lithium methanesulfonate (CH$_3$SO$_3$Li), lithium trifluoromethauesulfonate (CF$_3$SO$_3$Li), lithium bis(trifluoromethyl)sulfonimide (LiN(SO$_2$CF$_3$)$_2$) lithium bis(perfluoroethylsulfonyl)imide (LiN(SO$_2$C$_2$F$_5$)$_2$), chloroborane lithium, lower aliphatic carboxylic acid lithium, and lithium tetraphenyl borate, or a mixture of two or more thereof.

More specifically, the lithium salt may be lithium hexafluorophosphate (LiPF$_6$). Since LiPF$_6$ has a high degree of dissociation, LiPF$_6$ may increase the conductivity of the non-aqueous electrolyte and furthermore, may suppress the reductive decomposition reaction of the electrolyte on the negative electrode. Accordingly, when the phosphorus compound of Formula 1 is used with LiPF$_6$ as the lithium salt, a further improved effect in terms of room temperature, and low-temperature cycle characteristics and low-temperature capacity characteristics may be obtained.

Also, the lithium salt may be comprised in a concentration of 0.6 mol/l to 2 mol/l in the non-aqueous electrolyte. In a case in which the concentration of the lithium salt is less than 0.6 mol/l, since the conductivity of the non-aqueous electrolyte may decrease, the performance of the non-aqueous electrolyte may be degraded. In a case in which the concentration of the lithium salt is greater than 2 mol/l, the viscosity of the non-aqueous electrolyte may increase and thus, mobility of lithium ions may be reduced. In consideration of the conductivity of the non-aqueous electrolyte and the mobility of the lithium ions, the lithium salt, specifically, may be comprised in a concentration of 0.7 mol/l to 1.6 mol/l in the electrolyte.

In the non-aqueous electrolyte according to the embodiment of the present invention, an additive comprised in a non-aqueous electrolyte for the purpose of improving the lifetime characteristics of the battery, preventing a decrease in the battery capacity, and improving the discharge capacity of the battery may be selectively further comprised in addition to the above-described components.

Specifically, the additive may comprise pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and any one thereof or a mixture of two or more thereof may be used. Also, the additive may be comprised in an amount of 0.1 wt % to 1 wt % based on the total weight of the non-aqueous electrolyte.

According to another embodiment of the present invention, a lithium secondary battery comprising the above-described non-aqueous electrolyte is provided.

Specifically, the lithium secondary battery comprises a negative electrode, a positive electrode, a separator, and the non-aqueous electrolyte.

The lithium secondary battery may be manufactured according to a typical method known in the art and may be manufactured by inserting a porous separator between a negative electrode and a positive electrode and injecting the non-aqueous electrolyte according to the present invention.

In the lithium secondary battery, the negative electrode comprises a negative electrode collector and a negative electrode active material layer disposed on the negative electrode collector. Also, the negative electrode active material layer may comprise a negative electrode active material and may selectively further comprise a conductive agent and a binder.

In the negative electrode active material layer, a compound capable of reversibly intercalating and deintercalating lithium may be used as the negative electrode active material. As a specific example, a carbon material, a metal compound, or a mixture thereof may be used. Both low crystalline carbon and high crystalline carbon may be used as the carbon material.

Typical examples of the low crystalline carbon may be soft carbon and hard carbon, typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes, and any material typically used as a carbon material for a lithium secondary battery may be used without limitation.

Also, the metal compound may be a compound including at least one metal element selected from the group consisting of silicon (Si), germanium (Ge), tin (Sn), lead (Pb), phosphorus (P), antimony (Sb), bismuth (Bi), aluminum (Al), gallium (Ga), indium (In), titanium (Ti), manganese (Mn), iron (Fe), cobalt (Co), nickel (Ni), copper (Cu), zinc (Zn), silver (Ag), magnesium (Mg), strontium (Sr), and barium (Ba). These metal compounds may be used in any form such as a simple substance, an alloy, an oxide ($TiO_2$, $SnO_2$, etc.), a nitride, a sulfide, a boride, or an alloy with lithium, but the simple substance, the alloy, the oxide, and the alloy with lithium may obtain a high capacity battery. Among them, the compound may contain at least one element selected from Si, Ge, and Sn, and a battery having higher capacity may be obtained when at least one element selected from Si and Sn is included.

More specifically, the negative electrode active material may include lithium titanium oxide (LTO). The lithium titanium oxide may be specifically $Li_{0.8}Ti_{2.2}O_4$, $Li_{2.67}Ti_{1.33}O_4$, $LiTi_2O_4$, $Li_{1.33}Ti_{1.67}O_4$, or $Li_{1.14}Ti_{1.71}O_4$, and any one thereof or a mixture of two or more thereof may be used.

In the presence of the negative electrode including the lithium titanium oxide, when the non-aqueous electrolyte including the phosphorus compound according to the embodiment of the present invention is injected into the lithium secondary battery, the resistance of the SEI formed on the surface of the electrode may be reduced as described above.

Also, in the negative electrode, the conductive agent is used to provide conductivity to the negative electrode, and any conductive agent may be used without particular limitation so long as it has suitable electronic conductivity without causing adverse chemical changes in the battery. Specific examples of the conductive agent may be carbon-based materials such as natural graphite or artificial graphite, carbon black, acetylene black, Ketjen black, channel black, furnace black, lamp black, thermal black, or carbon fibers; metal powders or metal fibers such as copper, nickel, aluminum, or silver; acicular or dendritic conductive whiskers such as zinc oxide whiskers and calcium carbonate whiskers; conductive metal oxides such as titanium oxide; or conductive polymers such as polyphenylene derivatives, and any one thereof or a mixture of two or more thereof may be used. The conductive agent may be included in an amount of 1 part by weight to 30 parts by weight based on 100 parts by weight of the negative electrode active material.

Furthermore, in the negative electrode, the binder improves the adhesion between negative active material particles and the adhesion between the negative electrode active material and the current collector, and any binder may be used without particular limitation as long as it is typically used in a composition for forming a negative electrode. Specifically, the binder may include a fluorinated polymer such as polyvinylidene fluoride (PVDF), polytetrafluoroethylene, polyhexafluoropropylene, or a polyvinylidene fluoride-hexafluoropropylene copolymer (PVDF-co-HFP); a polyalkylene-based polymer such as polyethylene or polypropylene; a poly(meth)acrylate-based polymer such as polymethylmethacrylate or polyacrylate; polyacrylonitrile; a cellulose-based polymer such as carboxymethyl cellulose (CMC); or various rubbers such as a styrene-butadiene rubber or a fluorine rubber, and any one thereof or a mixture of two or more thereof may be used.

Also, the binder may be a fluorinated polymer which includes a functional group capable of hydrogen bonding with a hydroxyl group on the surface of the negative electrode active material, specifically, a carboxyl group, a hydroxyl group, a sulfonic acid group, and a glycidyl group. Thus, the functional groups included in the binder may improve the adhesiveness by forming hydrogen bonds with the hydroxyl groups present on the surface of the current collector or the surface of the negative electrode active material. Furthermore, since the binder may form a lithium-ion selective permeable film on the surface of the negative electrode active material, the binder may suppress the formation of a lithium compound which is synthesized by a reaction between the electrolyte and lithium ions on the surface of the negative electrode active material during initial discharge. As a result, since the amount of the thermally unstable lithium compound may be small even if the temperature in the battery is increased due to a short circuit, exothermic decomposition may be suppressed and the reaction between the electrolyte and the lithium ions in the negative electrode material may be suppressed. The binder may be included in an amount of 1 part by weight to 30 parts by weight based on 100 parts by weight of the negative electrode active material.

In the lithium secondary battery, the positive electrode includes a positive electrode collector and a positive electrode active material layer disposed on the positive electrode collector. Also, the positive electrode active material layer may include a positive electrode active material and may selectively further include a conductive agent and a binder.

In the positive electrode active material layer, a compound (lithiated intercalation compound) capable of reversibly intercalating and deintercalating lithium may be used as the positive electrode active material. Specifically, the positive electrode active material may be a lithium transition metal oxide including lithium and a transition metal such as cobalt, manganese, nickel, or aluminum, and, specifically, any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), and $Li_xFePO_4$ (0.5<x<1.3), or a mixture of two or more thereof may be used.

Also, in the positive electrode, the conductive agent and the binder may be the same as described in the negative electrode.

Any metal having high conductivity and no reactivity in a voltage range of the battery, in which compositions for forming the negative and positive electrode active material layers may be easily adhered thereto, may be used without limitation as the current collectors used in the negative electrode and the positive electrode. Specifically, the positive electrode collector may include aluminum, nickel, or a foil prepared by a combination thereof, and the negative electrode collector may include copper, gold, a nickel or copper alloy, or a foil prepared by a combination thereof. Also, two or more layers of base materials formed of the above materials may be stacked and used as the current collectors.

Also, electrode material mixtures may be respectively prepared by selectively mixing the negative electrode and positive electrode active materials with the conductive agent and the binder and dispersing in the solvent, and the negative electrode and the positive electrode may then be prepared by respectively coating, drying, and rolling the electrode material mixtures on at least one surface of the current collectors. Furthermore, a heat treatment may be further performed in a temperature of about 50° C. to about 250° C. for about 2 hours under vacuum after the rolling.

A thickness (for one surface of the current collector) of the positive electrode active material layer prepared by the above-described method may be in a range of 30 μm to 120 μm or 50 μm to 100 μm, and a thickness of the negative electrode active material layer may be in a range of 1 μm to 100 μm or 3 μm to 70 μm. In a case in which the positive electrode and the negative electrode satisfy the above thickness ranges, since the amount of the active material in each electrode active material layer may be sufficiently secured, the reduction of the battery capacity may be prevented and cycle characteristics or rate capability may be improved.

Also, the positive electrode and the negative electrode in the lithium secondary battery are isolated by the separator, and a typical porous polymer film used as a separator of a lithium secondary battery, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, and for example, a cylindrical type using a can, a prismatic type, a pouch type, or a coin type may be used. A cylindrical battery may be used, and for example, the cylindrical battery may include a current interrupt device (CID).

Since the lithium secondary battery according to the embodiment of the present invention stably exhibits improved lifetime characteristics as well as improved initial capacity and power characteristics at room temperature and low temperature, particularly, at low temperature (−10±5° C.) by including the phosphorus compound of Formula 1 as a non-aqueous electrolyte additive, the lithium secondary battery is suitable for portable devices, such as mobile phones, notebook computers, and digital cameras, and electric cars such as hybrid electric vehicles.

According to another embodiment of the present invention, a battery module including the lithium secondary battery as a unit cell and a battery pack including the battery module are provided.

The battery module or the battery pack may be used as a power source of a medium and large sized device, for example, a power tool, electric cars, such as an electric vehicle (EV), a hybrid electric vehicle (HEV), or a plug-in hybrid electric vehicle (PHEV), or a power storage system.

Hereinafter, the present invention will be described in more detail, according to specific examples. However, the following examples are merely provided to more clearly understand the present invention, not to limit the scope of the present invention.

EXAMPLE 1

(1) Preparation of Non-aqueous Electrolyte

A mixed solvent was prepared, in which ethylene carbonate (EC) and propyl propionate (PP) were mixed at a weight ratio of 3:7, and a solution was then prepared by adding $LiPF_6$, as a lithium salt, to the mixed solvent to obtain a $LiPF_6$ concentration of 1 M. Thereafter, a non-aqueous electrolyte was prepared by adding methacrylic acid phosphate of the following Formula 2b to the solution. Herein, the methacrylic acid phosphate was added to obtain 0.5 wt % based on a total weight of the non-aqueous electrolyte.

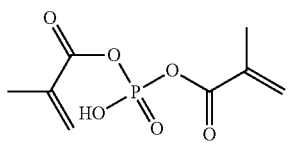

(2b)

(2) Preparation of Positive Electrode

A positive electrode active material was prepared by mixing $LiCoO_2$ and $LiNi_{0.56}Co_{0.2}Mn_{0.27}O_2$ at a weight ratio of 2:1. Thereafter, a positive electrode material mixture was prepared by mixing the positive electrode active material, carbon black as a conductive agent, and polyvinylidene fluoride (PVDF) as a binder at a weight ratio of 96:2:2, and a positive electrode was then prepared by coating an aluminum (Al) foil current collector with the positive electrode material mixture and drying the coated current collector.

(3) Preparation of Negative Electrode

A negative electrode material mixture was prepared by mixing $Li_{0.8}Ti_{2.2}O_4$ (LTO) as a negative electrode active material, a styrene-butadiene rubber (SBR) binder, and carboxymethyl cellulose (CMC) as a thickener at a weight ratio of 98:1:1, and a negative electrode was then prepared by coating a copper (Cu) foil current collector with the negative electrode material mixture and drying the coated current collector.

(4) Preparation of Lithium Secondary Battery

A coin cell was prepared by a typical method using the prepared non-aqueous electrolyte and an electrode assembly which was prepared by disposing a porous polyethylene membrane between the prepared positive electrode and negative electrode.

EXAMPLE 2

A lithium secondary battery was prepared in the same manner as in Example 1 except that a phosphorus compound of the following Formula 2a was used instead of methacrylic acid phosphate.

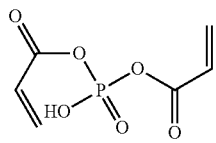

(2a)

EXAMPLE 3

A lithium secondary battery was prepared in the same manner as in Example 1 except that a phosphorus compound of the following Formula 2c was used instead of methacrylic acid phosphate.

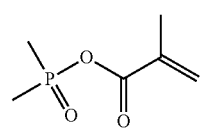

(2c)

EXAMPLE 4

A lithium secondary battery was prepared in the same manner as in Example 1 except that a phosphorus compound of the following Formula 2f was used instead of methacrylic acid phosphate.

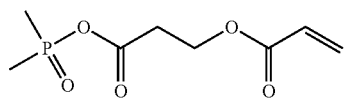

(2f)

COMPARATIVE EXAMPLE 1

A lithium secondary battery was prepared in the same manner as in Example 1 except that methacrylic acid phosphate was not added in (1) preparation of non-aqueous electrolyte of Example 1.

EXPERIMENTAL EXAMPLE 1

Evaluation of Battery Performance at Room Temperature

The performances of the batteries prepared in Example 1 and Comparative Example 1 were evaluated by the following method. Each test was repeated three times, and the results thereof are respectively represented as an average value of three measurements.

The batteries prepared in Example 1 and Comparative Example 1 were charged at 0.1 C in a driving voltage of 1.2 V to 2.0 V at room temperature (23° C.) until the state of charge (SOC) reached 20%, and changes in capacitance versus voltage ratio were observed. The results thereof are presented in FIG. 1.

As illustrated in FIG. 1, with respect to the battery of Example 1 which includes the non-aqueous electrolyte including methacrylic acid phosphate, a peak (see dotted circle) corresponding to a reduction reaction was observed in a voltage range of 1.5 V to 1.8 V. This result was due to the fact that a stable solid electrolyte interface (SEI) was formed by the reaction of the methacrylic acid phosphate included in the battery of Example 1 on the surface of the LTO negative electrode.

Also, the lithium secondary batteries prepared in Example 1 and Comparative Example 1 were charged at 0.3 C and discharged at 0.3 C at room temperature (23° C.), and initial capacities of the batteries were measured. The results thereof are presented in FIG. 2.

Figure 2:
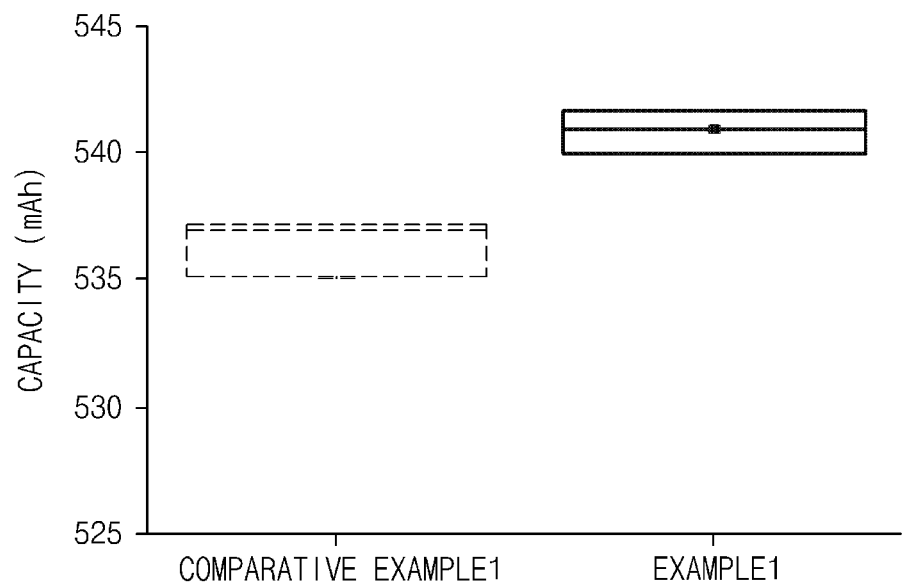
FIG. 2 is a graph illustrating initial capacities of the batteries prepared in Example 1 and Comparative Example 1.

As illustrated in FIG. 2, the battery of Example 1, which included the non-aqueous electrolyte including methacrylic acid phosphate, exhibited an initial capacity of 540 mAh or more, which was improved by about 0.9% in comparison to the initial capacity (535 to 537 mAh) of the battery of Comparative Example 1 in which methacrylic acid phosphate was not included in the electrolyte.

Furthermore, in order to evaluate power characteristics of the lithium secondary batteries prepared in Example 1 and Comparative Example 1, power at 5 C and resistance of the batteries charged and discharged at 23° C. were measured at 50% SOC. The results thereof are presented in FIGS. 3 and 4.

Figure 3:
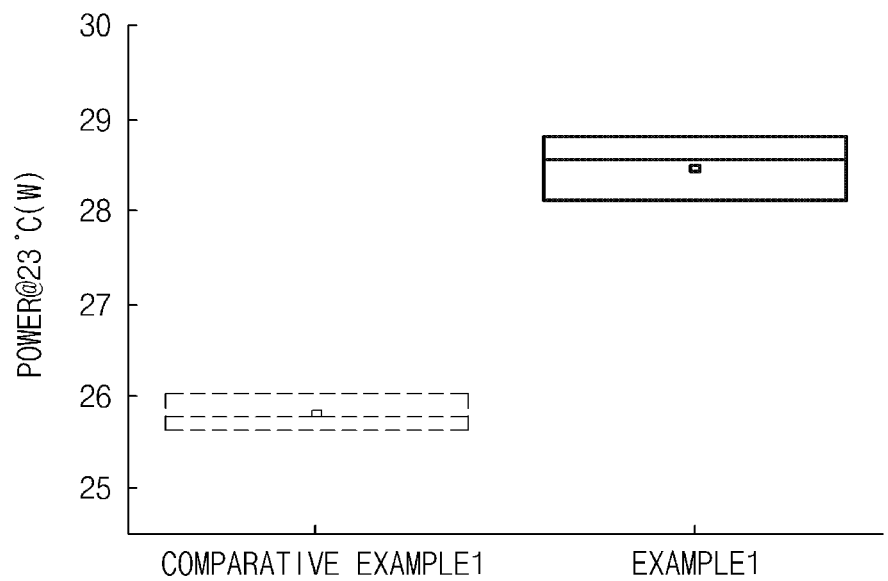
FIG. 3 is a graph illustrating powers of the batteries prepared in Example 1 and Comparative Example 1.
Figure 4:
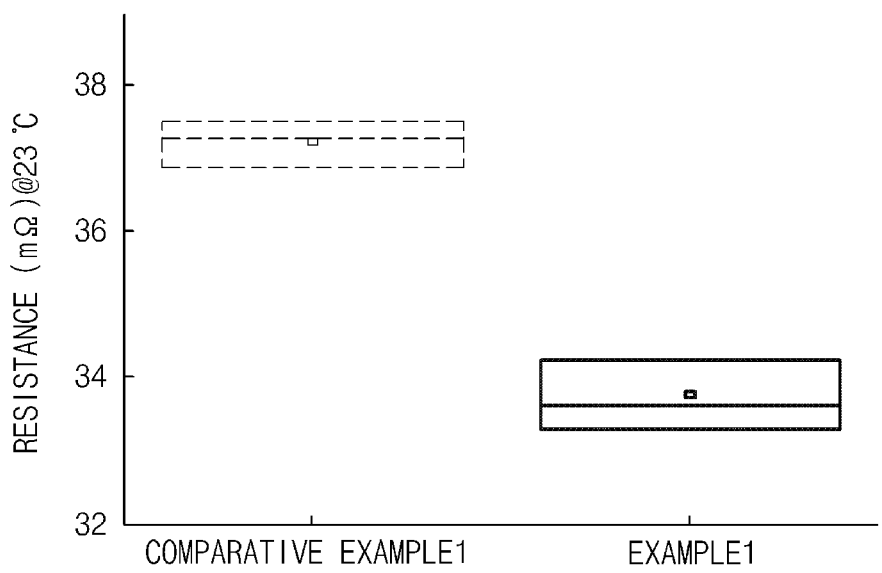
FIG. 4 is a graph illustrating resistances of the batteries prepared in Example 1 and Comparative Example 1.

As illustrated in FIGS. 3 and 4, the resistance of the battery of Example 1, which included the non-aqueous electrolyte including methacrylic acid phosphate, was decreased by about 11% in comparison to Comparative Example 1, and as a result, power characteristics were improved. Specifically, the power of the battery prepared in Example 1 was improved by 11% in comparison to Comparative Example 1.

EXPERIMENTAL EXAMPLE 2

Evaluation of Battery Performance at Low Temperature

Discharge power at 5 C for the SOC in a driving voltage of 1.2 V to 2.0 V at low temperature (−10° C.) and power per time (pulse: 0.5 seconds) according to the reduction in the resistance were respectively measured for the batteries prepared in Example 1 and Comparative Example 1 three times. The results thereof are presented in FIGS. 5 and 6.

Figure 5:
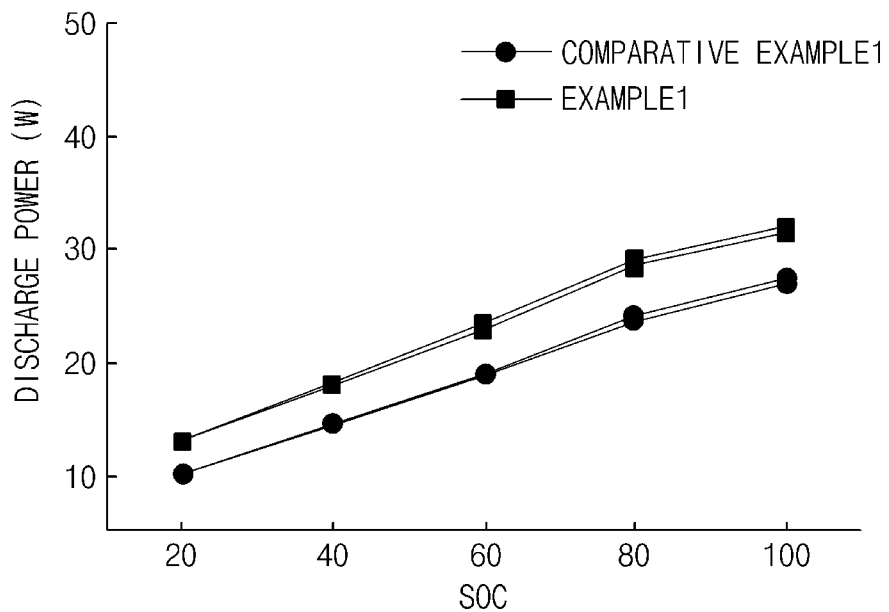
FIG. 5 is a graph illustrating discharge powers of the batteries prepared in Example 1 and Comparative Example 1.

FIG. 5 is a graph illustrating discharge powers of the batteries prepared in Example 1 and Comparative Example 1. As illustrated in FIG. 5, the battery of Example 1, which included the non-aqueous electrolyte including methacrylic acid phosphate, exhibited higher power than the battery prepared in Comparative Example 1 even at a low temperature of −10° C., and specifically, exhibited power which was improved by about 25%. Also, resistance characteristics were improved by about 20%.

Figure 6:
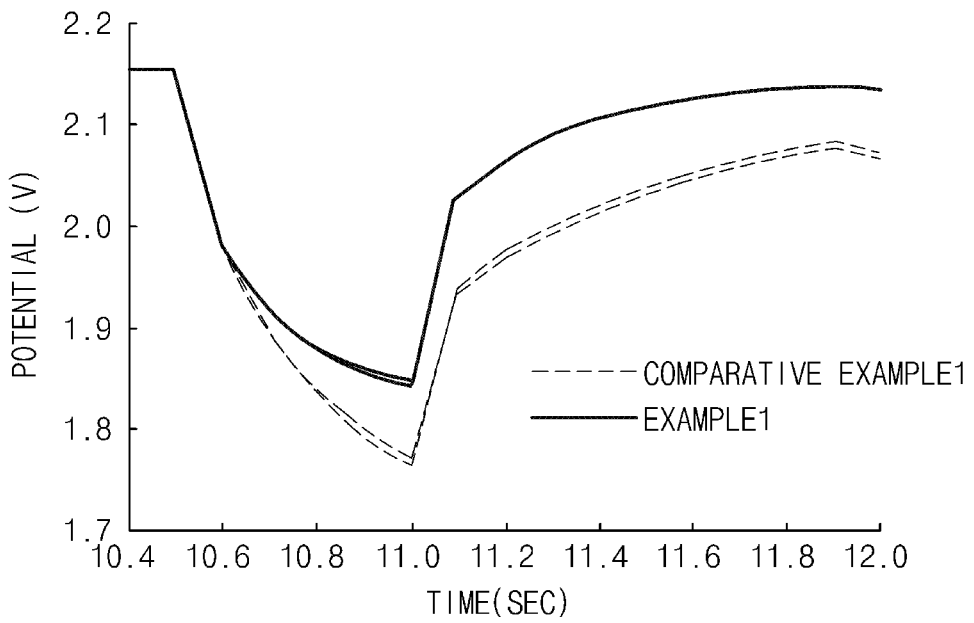
FIG. 6 is a graph illustrating changes in potential with time when reducing the resistances of the batteries prepared in Example 1 and Comparative Example 1.

FIG. 6 is a graph illustrating changes in potential with time, i.e. power, when reducing the resistances of the batteries prepared in Example 1 and Comparative Example 1. As illustrated in FIG. 6, it may be confirmed that the battery prepared in Example 1 had higher power per time during the reduction in the resistance than the battery prepared in Comparative Example 1. It may be understood that the power of the battery prepared in Example 1 was improved by 0.7% even at low temperature (−10° C.).

The invention claimed is:

1. A non-aqueous electrolyte comprising:
an organic solvent;
a lithium salt; and
a phosphorus compound of Formula 1,

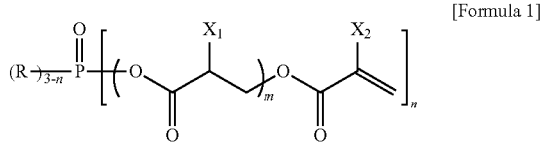

[Formula 1]

wherein, in Formula 1,
$X_1$ and $X_2$ are each independently a hydrogen atom or an alkyl group having 1 to 4 carbon atoms,
R is selected from the group consisting of an alkyl group having 1 to 20 carbon atoms, a cycloalkyl group having 3 to 20 carbon atoms, a hydroxyl group, and an alkoxy group having 1 to 20 carbon atoms,
m is an integer of 0 to 29, and n is an integer of 1 or 2.

2. The non-aqueous electrolyte of claim 1, wherein $X_1$ and $X_2$ are each independently a hydrogen atom or an alkyl group having 1 to 4 carbon atoms, and
R is an alkyl group having 1 to 6 carbon atoms or a hydroxyl group.

3. The non-aqueous electrolyte of claim 1, wherein $X_1$ and $X_2$ are each independently a hydrogen atom or an alkyl group having 1 to 4 carbon atoms,
R is a hydroxyl group,
m is an integer of 0 or 1, and
n is an integer of 1 or 2.

4. The non-aqueous electrolyte of claim 1, wherein the phosphorus compound is comprised in an amount of 0.05 wt % to 5.0 wt % based on a total weight of the non-aqueous electrolyte.

5. The non-aqueous electrolyte of claim 1, wherein the organic solvent comprises any one selected from the group consisting of a carbonate-based solvent, an ester-based solvent, an ether-based solvent, a ketone-based solvent, and an aromatic hydrocarbon-based solvent, or a mixture of two or more thereof.

6. The non-aqueous electrolyte of claim 1, wherein the organic solvent comprises a mixture, in which a cyclic carbonate-based solvent and an ester-based solvent are mixed in a volume ratio of 5:5 to 2:8.

7. The non-aqueous electrolyte of claim 6, wherein the cyclic carbonate-based solvent comprises any one selected from the group consisting of ethylene carbonate, propylene carbonate, 1,2-butylene carbonate, 2,3-butylene carbonate, 1,2-pentylene carbonate, 2,3-pentylene carbonate, vinylene carbonate, vinyl ethylene carbonate, and fluoroethylene carbonate, or a mixture of two or more thereof.

8. The non-aqueous electrolyte of claim 6, wherein the ester-based solvent comprises any one selected from the group consisting of dimethyl sulfoxide, acetonitrile, dimethoxy ethane, diethoxy ethane, sulfolane, γ-butyrolactone, propylene sulfide, tetrahydrofuran, methyl acetate, ethyl acetate, methyl propionate, ethyl propionate, propyl propionate, methyl butyrate, and ethyl butyrate, or a mixture of two or more thereof.

9. The non-aqueous electrolyte of claim 1, wherein the lithium salt comprises any one selected from the group consisting of lithium chloride (LiCl), lithium bromide (LiBr), lithium iodine (LiI), lithium perchlorate ($LiClO_4$), lithium tetrafluoroborate ($LiBF_4$), lithium hexafluorophosphate ($LiPF_6$), lithium hexafluoroarsenate ($LiAsF_6$), lithium hexafluoroantimonate ($LiSbF_6$), lithium tetrachloroaluminate ($LiAlCl_4$), lithium methanesulfonate ($CH_3SO_3Li$), lithium trifluoromethanesulfonate ($CF_3SO_3Li$), lithium bis(trifluoromethyl)sulfonimide ($LiN(SO_2CF_3)_2$), lithium bis(perfluoroethylsulfonyl)imide ($LiN(SO_2C_2F_5)_2$), chloroborane lithium, aliphatic carboxylic acid lithium, and lithium tetraphenyl borate, or a mixture of two or more thereof.

10. A lithium secondary battery comprising:
a negative electrode;
a positive electrode;
a separator; and
the non-aqueous electrolyte of claim 1.

11. The lithium secondary battery of claim 10, wherein the negative electrode comprises a negative electrode active material which is selected from the group consisting of a carbon material, a metal compound, and a mixture thereof.

12. The lithium secondary battery of claim 11, wherein the carbon material comprises any one selected from the group consisting of soft carbon, hard carbon, natural graphite, Kish graphite, pyrolytic carbon, mesophase pitch-based carbon fibers, meso-carbon microbeads, mesophase pitches, and petroleum or coal tar pitch derived cokes, or a mixture of two or more thereof.

13. The lithium secondary battery of claim 11, wherein the metal compound is a compound comprising at least one metal element selected from the group consisting of silicon (Si), germanium (Ge), tin (Sn), lead (Pb), phosphorus (P), antimony (Sb), bismuth (Bi), aluminum (Al), gallium (Ga), indium (In), titanium (Ti), manganese (Mn), iron (Fe), cobalt (Co), nickel (Ni), copper (Cu), zinc (Zn), silver (Ag), magnesium (Mg), strontium (Sr), and barium (Ba), or a mixture thereof.

14. The lithium secondary battery of claim 10, wherein the negative electrode comprises a lithium titanium oxide-based negative electrode active material.

15. The lithium secondary battery of claim 14, wherein the lithium titanium oxide-based negative electrode active material comprises any one selected from the group consisting of $Li_{0.8}Ti_{2.2}O_4$, $Li_{2.67}Ti_{1.33}O_4$, $Ti_2O_4$, $Li_{1.33}Ti_{1.67}O_4$, and $Li_{1.14}Ti_{1.71}O_4$, or a mixture of two or more thereof.

16. The lithium secondary battery of claim 10, wherein the positive electrode comprises a positive electrode active material layer including a lithium-containing transition metal oxide.

17. The lithium secondary battery of claim 16, wherein the lithium-containing transition metal oxide comprises any one selected from the group consisting of $Li_xCoO_2(0.5<x<1.3)$, $Li_xNiO_2(0.5<x<1.3)$, $Li_xMnO_2(0.5<x<1.3)$, $Li_xMn_2O_4$ $(0.5<x<1.3)$, $Li_x(Ni_aCo_bMn_c)O_2(0.5<x<1.3, 0<a<1, 0<b<1, 0<c<1, a+b+c=1)$, $Li_xNi_{1-y}Co_yO_2(0.5<x<1.3, 0<y<1)$, $Li_xCo_{1-y}Mn_yO_2(0.5<x<1.3, 0<y<1)$, $Li_xNi_{1-y}Mn_yO_2$ $(0.5<x<1.3, 0\leq y<1)$, $Li_x(Ni_aCo_bMn_c)O_4(0.5<x<1.3, 0<a<2, 0<b<2, 0<c<2, a+b+c=2)$, $Li_xMn_{2-z}Ni_zO_4(0.5<x<1.3, 0<z<2)$, $Li_xMn_{2-z}Co_zO_4(0.5<x<1.3, 0<z<2)$, $Li_xCoPO_4$ $(0.5<x<1.3)$, and $Li_xFePO_4(0.5<x<1.3)$, or a mixture of two or more thereof.

18. The lithium secondary battery of claim 10, wherein the separator comprises any one selected from the group consisting of an ethylene homopolymer, a propylene homopolymer, an ethylene/butene copolymer, an ethylene/hexene copolymer, an ethylene/methacrylate copolymer, and a porous nonwoven fabric, or a stack of two or more layers thereof.

19. A battery module comprising the lithium secondary battery of claim 10 as a unit cell.

20. A battery pack comprising the battery module of claim 19.

21. The battery pack of claim 20, wherein the battery pack is used as a power source of a medium and large sized device.

22. The battery pack of claim 21, wherein the medium and large sized device is selected from the group consisting of an electric vehicle, a hybrid electric vehicle, a plug-in hybrid electric vehicle, and a power storage system.

* * * * *